(12) United States Patent
Loftin

(10) Patent No.: US 6,465,564 B1
(45) Date of Patent: Oct. 15, 2002

(54) OVERHEAD PROJECTOR INKS

(75) Inventor: Rachel M. Loftin, Halifax, MA (US)

(73) Assignee: Berol Corporation, Freeport, IL (US)

( * ) Notice: Subject to any disclaimer, the term of this patent is extended or adjusted under 35 U.S.C. 154(b) by 0 days.

(21) Appl. No.: 08/309,543

(22) Filed: Sep. 20, 1994

Related U.S. Application Data

(63) Continuation of application No. 08/086,235, filed on Jul. 1, 1993, now abandoned.

(51) Int. Cl.$^7$ ................................................. C08L 33/00
(52) U.S. Cl. ........................ 524/556; 524/543; 524/386; 524/261
(58) Field of Search ................................. 524/317, 556, 524/312

(56) References Cited

U.S. PATENT DOCUMENTS

| | | | |
|---|---|---|---|
| 3,834,823 A | * 9/1974 | Seregely et al. | ............ 106/202 |
| 3,949,132 A | 4/1976 | Seregely et al. | |
| 4,097,289 A | * 6/1978 | Hofmann et al. | ............. 106/30 |
| 4,256,494 A | 3/1981 | Yamamoto et al. | |
| 4,740,549 A | * 4/1988 | Okuzono et al. | ............ 524/379 |
| 4,935,461 A | * 6/1990 | Nakamura | .................... 524/317 |
| 4,940,628 A | * 7/1990 | Lin et al. | ..................... 523/161 |
| 5,004,763 A | * 4/1991 | Imagawa | ..................... 524/564 |
| 5,316,574 A | 5/1994 | Fujita et al. | |
| 5,318,617 A | 6/1994 | Nagasawa et al. | |

FOREIGN PATENT DOCUMENTS

| | | |
|---|---|---|
| EP | 0 322 805 B1 | 7/1989 |
| EP | 0 556 668 A1 | 8/1993 |
| JP | 1-174577 | 7/1989 |

* cited by examiner

*Primary Examiner*—David W. Wu
*Assistant Examiner*—Rip Lee
(74) *Attorney, Agent, or Firm*—Marshall, Gerstein & Borun

(57) ABSTRACT

A dry-wipeable overhead projector film ink is provided which includes a colorant, an acrylic polymer having a film forming temperature below room temperature, and water. Preferred inks further include a surfactant and an anti-drying agent. The inks are easily removable from most types of overhead projector film by wiping with a dry cloth or fingertip. Certain preferred inks are also removable by wiping with a wet cloth.

19 Claims, No Drawings

OVERHEAD PROJECTOR INKS

This is a continuation of application Ser. No. 08/086,235, filed Jul. 1, 1993, now abandoned.

BACKGROUND OF THE INVENTION

This invention relates to ink compositions.

Overhead projectors are widely used, particularly in academic and business settings. Overhead projectors enable a marking on a transparent film to be projected on a screen or wall by shining light through the transparent film. A speaker giving a presentation can write on the transparent film, and/or make additions or corrections to a preprinted image, while the film is on the overhead projector. This allows the speaker a flexibility which would not be possible if transparencies or other audiovisual aids were used.

Conventional inks for use on overhead projector (OHP) film fall into two categories: permanent OHP inks and erasable OHP inks. Most erasable OHP inks are "washable," i.e., water is required to remove a marking made with the ink. This can make removal of the markings messy and inconvenient, and also can make it difficult to erase a small portion of a marking.

SUMMARY OF THE INVENTION

The invention features aqueous inks for use in marking overhead projectors. These inks form markings of excellent quality and light transmission on, and are readily removable from most commercially available overhead projector films. The inks are dry-wipeable, i.e., a marking made on an overhead projector film with the ink may be removed, after drying, by wiping the marking with a dry cloth (i.e., a cloth, felt eraser, tissue, or the like). Advantageously, by dry wiping, a small area of a marking can be easily removed, without interfering with the rest of the marking. Markings made with preferred compositions may also be removed by the user by wiping the marking with a fingertip. Further, the markings formed with the inks wipe off cleanly, with minimal dust formation, and resist inadvertent removal, e.g., when sheets of OHP film are shuffled together or photocopied. Some preferred compositions are also water wipeable, as well as dry-wipeable.

The inks of the invention include a colorant, a polymer having a film-forming temperature below room temperature, and water.

In preferred compositions, the polymer is an acrylic polymer, preferably provided in the form of an emulsion. The acrylic polymer preferably has a glass transition temperature ($T_g$) of from about +20° C. to −40° C. and a film forming temperature below room temperature (25° C.), preferably below 20° C. Preferably, the ink further includes a surfactant, more preferably a silicone surfactant, and an anti-drying agent, more preferably a humectant, most preferably glycerol.

The term "film forming temperature," as used herein, refers to the temperature at which the film forming polymer forms a continuous dry film. The term "glass transition temperature," as used herein, refers to the temperature at which the mobility of randomly cited long chain molecules in the film forming polymer is lost.

It has been found that, by adjusting the pH of the ink composition, the ink can be rendered washable as well as dry-wipeable. Accordingly, if washability is desired, the compositions further include a base, e.g., a buffer. Preferably, sufficient base is added to adjust the pH of the ink composition to from about 7 to 10.

Preferred compositions may also include a peeling agent, e.g., a latex polymer, to enhance removability of the dry marking, and/or a fluoropolymer, to extend the period of time over which the marking remains dry-wipeable.

Other features and advantages of the invention will be apparent from the Description of the Preferred Embodiments and from the claims.

DESCRIPTION OF THE PREFERRED EMBODIMENTS

Preferred marker inks include a surfactant, an acrylic film-forming polymer, an anti-drying agent, a pigment, and water.

The surfactant is preferably a silicone surfactant. Suitable silicone surfactants include, but are not limited to, silanes and siloxanes. Preferred silicone surfactants are polyalkylene oxide-modified methylpolysiloxanes, e.g., those commercially available from Union Carbide under the tradename SILWET. Preferred compositions contain from about 0.1 to 5 weight percent surfactant, more preferably from about 0.5 to 2 weight percent. Lower levels may reduce wetting of the OHP film by the ink, while higher levels may cause too much adhesion of the ink to the film.

The acrylic polymer is preferably provided in the form of an emulsion. Typical emulsions have a solids level of about 50%. If desired, a water soluble acrylic may be used and predissolved in the water which will be contained in the ink composition. Preferred acrylic polymers have a glass transition temperature of from about +20° C. to −40° C. and a film forming temperature below room temperature, more preferably below 10° C. Preferred acrylic polymers include those commercially available under the tradename G-CRYL from Henkel Corp., and the tradename ACRYSOL from Rohm & Haas. Particularly preferred acrylic emulsions are G-CRYL 1200 and ACRYSOL I-1955. Acrysol I-1955 has a glass transition temperature of 26° C. Preferred compositions contain from about 5 to 15 weight percent of the acrylic polymer. Too much of the acrylic may result in undesirably high viscosity at an effective level of resin and may reduce the removability of the dried marking, while too little may result in an ink which does not form a coherent film on all overhead projector films.

The anti-drying agent is preferably a humectant, more preferably glycerol. Glycols are typically less preferred, as they may cause smearing when the marking is dry-wiped. The anti-drying agent prevents dry-out of a marker containing the ink when its cap is left off, and also significantly enhances removability of the dried marking. Too much of the anti-drying agent may cause the ink to dry too slowly, while too little may not prevent drying out of the marker and may reduce removability. Preferred compositions include from 1 to 25 weight percent of the humectant, preferably from about 5 to 20 weight percent.

Enough pigment should be included in the ink to provide an adequate color intensity, but not so much that light transmission is compromised. The preferred inks include between approximately 2% and 20% pigment by weight, more preferably between approximately 5% and 10%. Pigments that may be used in the invention include water dispersible pigments, and preferably the pigment is provided in the form of an aqueous dispersion, for accurate measurement and uniform mixing. Preferred pigment dispersions contain an acrylic dispersant, as these dispersions are most compatible with the acrylic polymer component of the composition. Suitable pigment dispersions are available from HeucoTech, under the tradename HEUCOSPERSE III. It is preferred that the pigment have a relatively small particle size, preferably less than 0.5 micron, to prevent settling and for use in capillary feed markers.

Sufficient water should be included in the ink so that its Brookfield viscosity at 25° C. is less than about 20 cps, more preferably between about 2 cps and 10 cps. If the viscosity is too low, the composition may not contain effective amounts of the active ingredients. If the viscosity is too high, the ink may be too thick for practical use, particularly in capillary feed systems.

Preferred compositions may, optionally, include a small amount of a peeling agent, to enhance the removability of the dried marking. Preferred peeling agents are latex polymers, more preferably styrene butadiene rubber (SBR) latexes. A suitable SBR latex is available from Goodyear under the tradename PLIOLITE. It is preferred that the composition contain from about 0 to 5 weight percent of the SBR latex. Too much of the peeling agent may cause a marking made with the ink to be crumbly or smeary.

Preferred compositions may also include a base, e.g., a buffer, if it is desired that markings formed by the ink be water washable as well as dry-wipeable. Acid stabilized acrylic emulsions are generally preferred for optimal washability with a wide variety of bases. A suitable emulsion is ACRYSOL I-1955 emulsion, available from Rohm and Haas. Suitable buffers include but are not limited to potassium hydroxide, sodium hydroxide, sodium carbonate and 2-amino-2-methyl-1-propanol. Preferred washable compositions contain from about 0.1 to 5 weight percent of the buffer. The preferred amount will depend upon the strength of the base selected and the initial pH of the composition. Preferably, a sufficient amount is included to bring the Ph of the ink to about 7 to 10.

Markings made with the preferred inks typically become permanent after a period of time, e.g., a week after the marking is made. This may be advantageous, if the user desires to store the marked OHP film for future use. However, if it is desired that markings made with the ink remain dry-wipeable over long periods, a fluoropolymer may be added to the ink to enhance long-term removability. A suitable fluoropolymer is available from Eastern Color and Chemical under the tradename RANE-OFF F-7. Preferred compositions contain from about 1 to 10 weight percent fluoropolymer.

Other conventional ingredients may be included in the composition, e.g., biocides.

A preferred procedure for preparing the compositions of the invention is to add the surfactant to the water, then add the acrylic emulsion, then the anti-drying agent, and finally the pigment dispersion, mixing between each addition. The order of addition is not critical however, and other procedures can be used, as is well known in the art. The ingredients can be mixed using any conventional mixer, under conditions of relatively low shear.

The following examples illustrate the invention.

EXAMPLE

Three preferred compositions are shown in Table 1. These compositions were used in capillary feed markers to form a series of markings on polyethylenes. Markings made with all three compositions were readily removable by wiping with a dry cloth, and by wiping with a fingertip. Markings made with composition 1 were also removable by wiping with a wet cloth. The markings which were not immediately removed were left for four days and then wiped with a dry cloth. The markings made with compositions 1 and 2 were not removable, i.e., had become permanent, while the marking made with composition 3 remained removable.

TABLE 1

| Component | Amount (%) | | |
|---|---|---|---|
| | 1 | 2 | 3 |
| ACRYSOL I-1955 emulsion | 25 | — | — |
| G-CRYL 1224 emulsion | — | 20 | — |
| ACX 12-903 emulsion | — | — | 20 |
| HEUCOSPERSE III BS 5520 pigment dispersion | 20 | 18 | 16 |
| Glycerol | 10 | 15 | 10 |
| 2-amino-2-methyl-1-propanol | 1 | — | — |
| SILWET L7001 surfactant | 0.5 | 0.5 | 0.5 |
| SILWET L7604 surfactant | 0.5 | 0.5 | 0.5 |
| RANE-OFF F7 fluoropolymer | — | — | 2 |
| Water* | 43 | 46 | 51 |

*(In addition to water in emulsion and pigment dispersion)

Other embodiments are within the claims. For example, preferred inks may also be used on other types of plastic film, e.g., polystyrene and acetate films.

What is claimed is:

1. A method of marking an overhead projector film, comprising:
    making a marking on the overhead projector film with an ink comprising a colorant, water, and a polymer provided as an aqueous emulsion or aqueous solution, said polymer having a glass transition temperature from 26° C. to −40° C., said ink being removable from the film with a dry tissue.
2. A method of claim 1 wherein the polymer has a film forming temperature below room temperature.
3. The method of claim 1 wherein said polymer is an acrylic polymer.
4. The method of claim 1 wherein said ink further comprises a surfactant.
5. The method of claim 1 wherein said ink further comprises an anti-drying agent.
6. The method of claim 1 wherein said ink comprises from about 0.1 to 5 weight of a surfactant, from about 2 to 20 weight percent of said colorant, from about 2 to 20 weight percent of said polymer, and from about 1 to 25 percent of an anti-drying agent.
7. The method of claim 1 wherein the polymer has a film forming temperature below 10° C.
8. The method of claim 4 wherein said surfactant is a silicone surfactant.
9. The method of claim 5 wherein said anti-drying agent is glycerol.
10. The method of claim 1 wherein the ink further comprises a base.
11. The method of claim 10 wherein said ink contains a sufficient amount of base to adjust the pH of the ink composition to from about 7 to 10.
12. The method of claim 10 wherein the polymer is acid-stabilized.
13. The method of claim 10 further comprising the step of removing the marking from the film by wiping the marking with a damp cloth.
14. The method of claim 1 wherein said ink further comprises a peeling agent.
15. The method of claim 14 wherein said peeling agent is a latex polymer.
16. The method of claim 1 wherein said ink further comprises a fluoropolymer.
17. The method of claim 1, wherein said glass transition temperature of said polymer is between about 20 and 40° C.
18. The method of claim 1, further comprising erasing the marking from the film.
19. The method of claim 1, further comprising removing the marking from the film with a dry cloth or dry tissue.

* * * * *

UNITED STATES PATENT AND TRADEMARK OFFICE
CERTIFICATE OF CORRECTION

PATENT NO.    : 6,465,564 B1
DATED         : October 15, 2002
INVENTOR(S)   : Rachel M. Loftin It is certified that error appears in the above-identified patent and that said Letters Patent is hereby corrected as shown below:

Column 4,
Line 29, please delete "A method" and insert -- The method -- in its place.
Line 62, please delete "about 20 to 40º C" and insert -- about 20 to -40º C -- in its place.

Signed and Sealed this

Eleventh Day of November, 2003

JAMES E. ROGAN
*Director of the United States Patent and Trademark Office*